May 3, 1938.   C. W. POINDEXTER ET AL   2,115,932
SAFETY APPLIANCE FOR AIRPLANES
Filed May 20, 1936   2 Sheets-Sheet 1
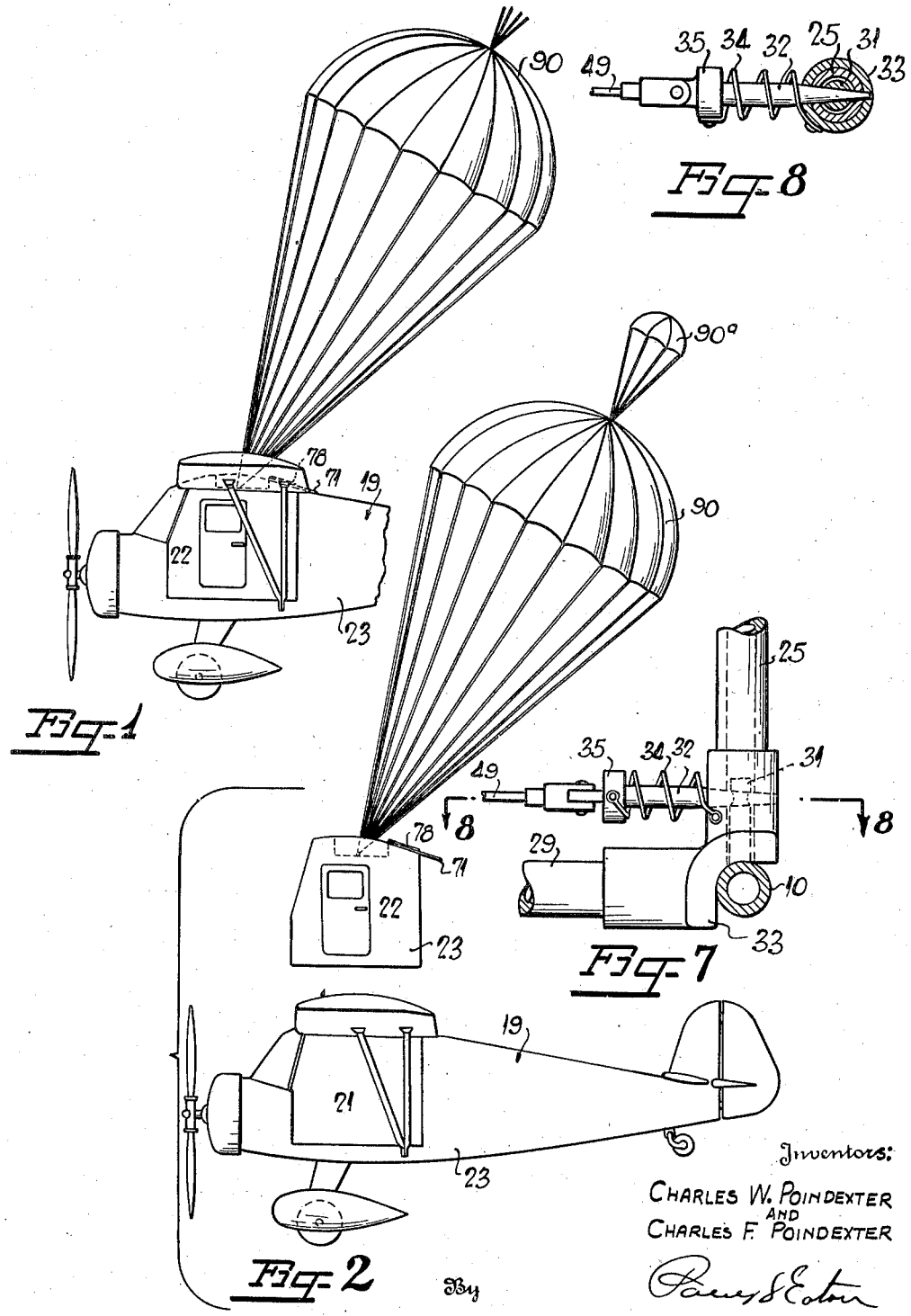
Inventors:
CHARLES W. POINDEXTER
AND
CHARLES F. POINDEXTER

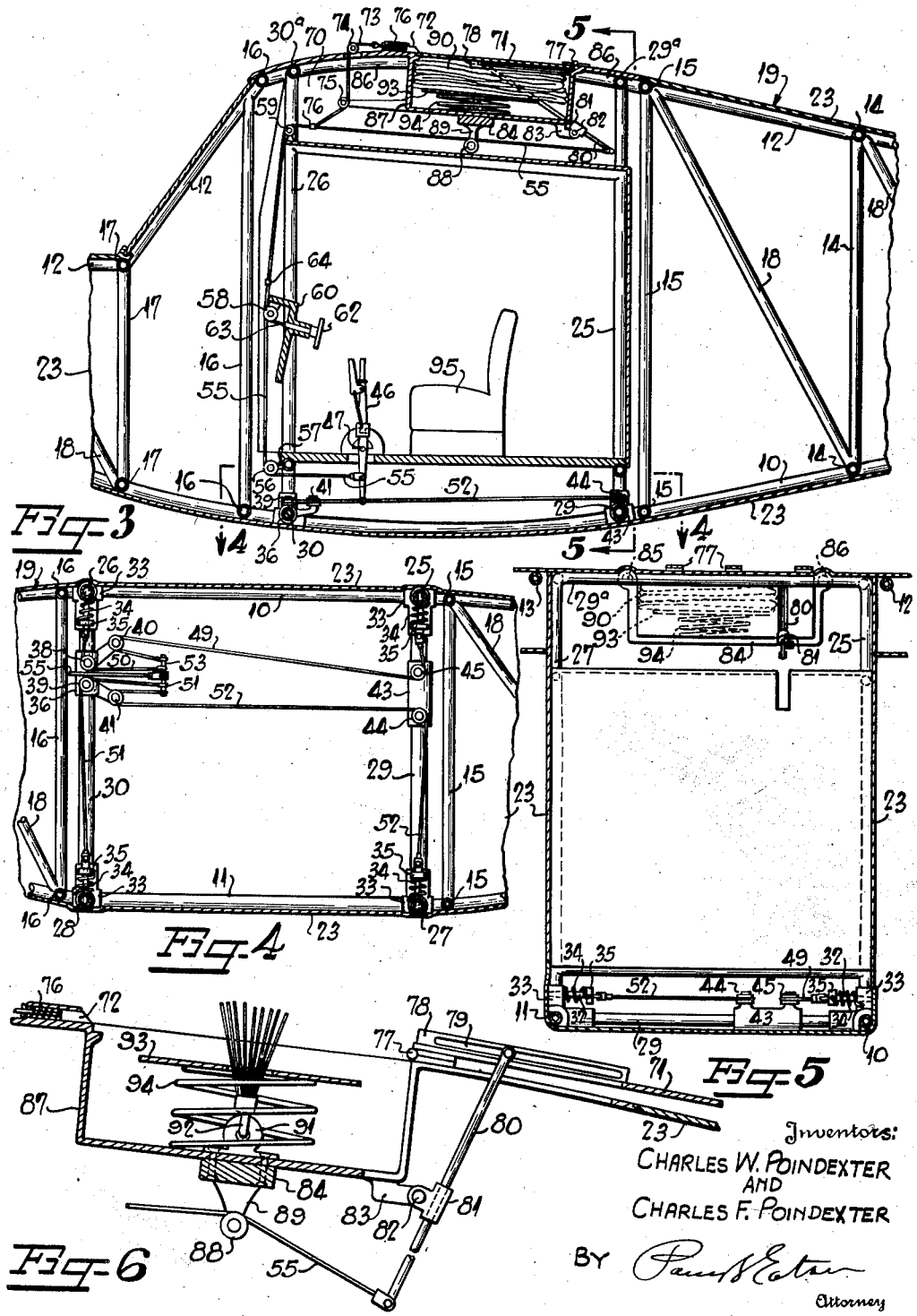

Patented May 3, 1938

2,115,932

UNITED STATES PATENT OFFICE 2,115,932

SAFETY APPLIANCE FOR AIRPLANES

Charles W. Poindexter and Charles F. Poindexter, near Yadkinville, N. C.

Application May 20, 1936, Serial No. 80,825

1 Claim. (Cl. 244—140)

This invention relates to safety means employed with airplanes for preventing injury to passengers and pilots in the event of power plant failure or structural failures of the airplanes or other causes or conditions resulting in inability of the aircraft to land safely.

It is an object of this invention to provide means associated with a heavier than air aircraft which can be manipulated by the pilot of the aircraft to release a parachute for checking the descent of the aircraft in the event of power plant or structural failures.

It is a further object of the invention to provide a parachute nested in a concealed position in the structure of the aircraft and which parachute can be released by an occupant of the airplane for opening and retarding the downward descent of the airplane.

It is still a further object of the invention to provide a detachable pilot and passenger cabin for an airplane and having a parachute associated therewith in concealed position together with means operable by an occupant of the cabin for releasing and unfolding a parachute and also releasing the cabin of the plane from the plane proper.

It is yet another object of the invention to provide an aircraft with a concealed parachute with means controlled by an occupant of the craft for releasing and unfolding the parachute to check the downward descent of the aircraft.

Some of the objects of the invention having been stated, other objects will appear as the description proceeds, when taken in connection with the accompanying drawings, in which:—

Figure 1 is a side elevation of a portion of an airplane and showing a parachute in unfolded position;

Figure 2 is a side elevation of an airplane and showing the cabin detached therefrom and suspended by the parachute;

Figure 3 is a longitudinal sectional view through the cabin portion of the airplane and showing the safety means in folded position;

Figure 4 is a sectional plan view taken along line 4—4 in Figure 3;

Figure 5 is a transverse vertical sectional view taken along line 5—5 in Figure 3;

Figure 6 is an enlarged detail of the upper central portion of Figure 3 taken along a different section line and showing the position the parts occupy when the parachute is in extended position;

Figure 7 is an enlarged detail view showing one of the means for detachably securing the cabin to the fuselage;

Figure 8 is a sectional view taken along line 8—8 in Figure 7.

Referring more specifically to the drawings, the numerals 10 and 11 indicate the lower longerons of the fuselage 19 of the airplane while 12 and 13 indicate the top longerons. These longerons are secured together by suitable vertical and horizontal struts such as 14, 15, 16, and 17. The longerons and struts are braced by suitable diagonal bracing tubes 18. The fuselage 19 has a cutaway portion 21 in which cabin 22 is adapted to fit. This cabin comprises vertical tubing 25, 26, 27 and 28 and transverse bottom tubes 29 and 30 and top transverse tubes 29a and 30a respectively forming the cabin with suitable covers and doors. The longerons, struts and diagonals have a covering 23 secured thereto for forming suitable external surfaces necessary for the proper operation of the plane. The lower longerons 10 and 11 have suitable fittings or pins 31 welded or otherwise secured thereto which have a hole therethrough into which a tapered pin 32 is adapted to project after passing through the upstanding portion of a fitting 33 disposed at the four lower corners of the detachable cabin (Fig. 7).

These pins are normally pressed home by means of a tension spring 34 secured at one end to portion 33 and the other end to the bolt head 35 of bolt 32. Each of these bolts has a suitable cable secured thereto. The transverse member 29 has secured thereon a bracket 36 having rollers 38, 39, 40 and 41 rotatably mounted thereon, which are grooved. The transverse tube 29 of the cabin has a fitting 43 secured thereto with rollers 44 and 45 mounted thereon. A lever 46 is disposed within the cabin and pivoted as at 47 and has cables 49, 50, 51 and 52 secured to a cross piece 53 on the lower end thereof. Cable 49 passes over rollers 40 and 45 and is secured to the rear right-hand pin 32 in the lower portion of the cabin. Cable 52 passes over rollers 41 and 44 and is secured to the left-hand rear pin 32 in the lower portion of the cabin. Cable 50 passes over roller 38 and is secured to the right-hand front pin 32 of the detachable cabin, while cable 51 passes over roller 39 and has its other end secured to the left front pin 32 mounted in the lower portion of the cabin. The lever 46 also has secured thereto a cable 55 which passes over a roller 56 secured on bracket 57 and is directed upwardly over rollers 58 and 59 and passes into the storage compartment for the parachute.

A portion of the instrument board 60 is shown and this has a knob 62, which is connected to a short length of cable 63 which has its other end secured or intertwined with cable 55 as at 64. The center section of the airplane, that is, the portion disposed between the two wings of the airplane, and immediately above the compartment of the cabin has a cavity 70 provided with a pivoted door 71 in the upper portion thereof. A latch 72 is slidably mounted on the exterior of the center section and has a cable 73 secured thereto which passes over rollers 74 and 75 and is secured as at 76 to cable 55. A compression spring 76 normally pushes the latch 72 rearwardly over the front free end of door 71 to hold it in closed position. The door 71 is pivoted at its rear end as at 77 and this door has a member 78 secured to the lower surface thereof having a slot 79 therein in which one end of a lever 80 is adapted to travel. This lever 80 is slidably mounted in a cuff 81 pivoted as at 82 to a fitting 83 secured to parachute compartment 87, said compartment being supported by a strut 84 which is U-shaped and has its ends secured to struts 85 and 86, (Figs. 3 and 5). Lever 80, at its lower end, has secured thereto one end of cable 55 which passes over a roller 88 mounted in an extension 89 projecting downwardly from a U-shaped member 84. U-shaped member 84 supports a parachute compartment 87 in which a parachute 90 is stored in folded position.

On the interior of compartment 87 and secured to struts 84 is an eye member 91 to which is secured an eye 92 having secured thereto parachute 90. Parachute 90 may have a small pilot chute 90a attached thereto to aid in opening the same. The parachute rests on a flat member 93 which is normally pressed upwardly by a compression spring 94.

When it is desired to unfold the parachute without detaching the cabin from the fuselage, the pilot, who is occupying the pilot's seat 95, may pull on knob 62 and this will release latch 72 and move lever 80 to open the door and as spring 94 is pressing the parachute 90 upwardly against this door, it will push the parachute out into the slip stream passing over the upper surface of the wing. The lift, which is present at this point, will pull the parachute out of the compartment, aided of course, by the pushing of spring 94 which spring will push a portion of the parachute out of the compartment and cause it to be engaged by the slip stream and opened. This will check the descent of the entire airplane and at least prevent serious injury to pilot and passengers within the plane.

In the event that this apparatus should be installed on air liners or on other aircraft, the weight of which is too great to be sufficiently checked by the parachute, then the cabin alone could be disconnected from the fuselage and at least the lives of the passengers in the compartment saved. In such an event the pilot would push forward on the upper end of lever 46 which would not only cause the latch 72 to be released and the door 71 opened and the parachute released into the slip stream, but it would also move the cables 49, 50, 51 and 52 to pull all of the pins 32 from the holes in the upper ends of fittings 31 to allow the cabin to be pulled upwardly by the opened parachute away from the fuselage and engine of the airplane. The cabin would then drift to the earth at a slow rate of speed while the fuselage and remaining portions of the airplane would be sacrificed to crashing.

In the drawings and specification there has been set forth a preferred embodiment of the invention, and although specific terms are employed, they are used in a generic and descriptive sense only, and not for purposes of limitation, the scope of the invention being set forth in the appended claim.

We claim:

An airplane having a fuselage, wings and a center section, and a cabin disposed beneath said center section and formed integrally with said center section, the center section having a compartment therein provided with a door hingedly secured at its rear edge to the center section and said center section having a spring pressed latch for engaging the front edge of said door for normally holding the door in closed position, a packed parachute disposed within said compartment and secured to said center section, spring means for expelling said parachute from said compartment, a lever for opening said door, a hand lever in the cabin, a cable secured to said latch and said lever and extending downwardly and being connected to said hand lever for opening said latch and moving the first-named lever to force said door open to release said parachute from said compartment, means for releasably confining said cabin to said fuselage, a plurality of cables connected to the hand lever and to said confining means for also releasing said confining means at the same time the parachute is released by operation of the hand lever for releasing the cabin from the fuselage and a handle secured to the first cable and extending into the cabin and being operable independently of the hand lever to release said latch and move the first lever to release the parachute without releasing the cabin.

CHARLES W. POINDEXTER.
CHARLES F. POINDEXTER.